(12) United States Patent
Yonemochi

(10) Patent No.: US 12,713,137 B2
(45) **Date of Patent: *Aug. 18, 2026**

(54) CONTROL DEVICE, CONTROL METHOD AND NON-TRANSITORY COMPUTER READABLE STORAGE MEDIUM

(71) Applicant: NIKON CORPORATION, Tokyo (JP)

(72) Inventor: Hajime Yonemochi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 18/436,298

(22) Filed: Feb. 8, 2024

(65) Prior Publication Data

US 2024/0223905 A1 Jul. 4, 2024

Related U.S. Application Data

(63) Continuation of application No. 17/681,311, filed on Feb. 25, 2022, now Pat. No. 11,936,988, which is a (Continued)

(30) Foreign Application Priority Data

Mar. 15, 2018 (JP) ................................ 2018-047968

(51) Int. Cl.
*H04N 23/71* (2023.01)
*H04N 23/73* (2023.01)

(Continued)

(52) U.S. Cl.
CPC ............. *H04N 23/71* (2023.01); *H04N 23/73* (2023.01); *H04N 25/51* (2023.01); *H04N 25/53* (2023.01); *H04N 25/78* (2023.01)

(58) Field of Classification Search
CPC ........ H04N 23/71; H04N 23/73; H04N 25/51; H04N 25/53; H04N 25/78; H04N 25/535;

(Continued)

(56) References Cited

U.S. PATENT DOCUMENTS 9,660,622 B2 5/2017 Kim et al.
2014/0132785 A1* 5/2014 Kobayashi .......... H10F 39/8063 348/208.1

(Continued)

FOREIGN PATENT DOCUMENTS

CN 107004390 A 8/2017
JP 2006-197192 7/2006

(Continued)

OTHER PUBLICATIONS

Office Action dated Jan. 6, 2025 for corresponding Taiwan Patent Application No. 112131317.

(Continued)

*Primary Examiner* — Ahmed A Berhan

(57) ABSTRACT

Provided is a control device for controlling an imaging condition of a sensor having one or more pixels, comprising an event detection unit for detecting an event indicating that a luminance signal changes in excess of a predetermined threshold value in one or more pixels, and for outputting an event detection signal; a counter for counting a number of events detected by the event detection unit; and a control unit for controlling the imaging condition of the sensor, based on the event detection signal. In addition, provided is a control method for controlling an imaging condition of a sensor having one or more pixels. The control method comprises detecting an event indicating that a luminance signal changes in excess of a predetermined threshold value in one or more pixels; counting a number of events; and controlling the imaging condition of the sensor, based on the detection of events.

25 Claims, 9 Drawing Sheets

Related U.S. Application Data continuation of application No. 17/017,277, filed on Sep. 10, 2020, now Pat. No. 11,297,249, which is a continuation of application No. PCT/JP2019/000383, filed on Jan. 9, 2019.

(51) Int. Cl.

| | |
|---|---|
| ***H04N 25/51*** | (2023.01) |
| ***H04N 25/53*** | (2023.01) |
| ***H04N 25/78*** | (2023.01) |

(58) Field of Classification Search

CPC .... H04N 23/651; H04N 25/443; H04N 23/60; G03B 7/091

See application file for complete search history.

(56) References Cited

U.S. PATENT DOCUMENTS

| | | | | |
|---|---|---|---|---|
| 2014/0374572 | A1 | 12/2014 | Kim et al. | |
| 2016/0094796 | A1 | 3/2016 | Govil | |
| 2016/0203610 | A1 | 7/2016 | Lee et al. | |
| 2017/0171482 | A1* | 6/2017 | Wakabayashi | H10F 39/18 |
| 2018/0084212 | A1 | 3/2018 | Wakabayashi | |
| 2018/0167575 | A1* | 6/2018 | Watanabe | H04N 25/78 |
| 2018/0189959 | A1* | 7/2018 | Berner | H04N 25/767 |
| 2018/0246214 | A1 | 8/2018 | Ishii et al. | |
| 2019/0268532 | A1 | 8/2019 | Iinuma | |
| 2020/0351455 | A1* | 11/2020 | Niwa | H04N 25/53 |
| 2020/0358977 | A1 | 11/2020 | Niwa et al. | |

FOREIGN PATENT DOCUMENTS

| | | | |
|---|---|---|---|
| JP | 2008-259107 | A | 10/2008 |
| JP | 2017-38174 | A | 2/2017 |
| WO | WO2017/013806 | | 1/2017 |
| WO | WO2017/098725 | A1 | 6/2017 |

OTHER PUBLICATIONS

International Search Report dated Apr. 9, 2019, in corresponding International Patent Application No. PCT/JP2019/000383.

Written Opinion of the International Searching Authority dated Apr. 9, 2019, in corresponding International Patent Application No. PCT/JP2019/000383.

International Preliminary Report on Patentability dated Sep. 15, 2020, in corresponding International Patent Application No. PCT/JP2019/000383.

Notice of Reasons for Refusal, dated Nov. 9, 2021, in corresponding Japanese Patent Application No. 2020-505611 (10 pp.).

Office Action, dated Mar. 30, 2021, in U.S. Appl. No. 17/017,277 (22 pp.).

Notice of Allowance, dated Nov. 29, 2021, in U.S. Appl. No. 17/017,277 (8 pp.).

Office Action dated Sep. 12, 2022, in U.S. Appl. No. 17/681,311.

Office Action dated May 24, 2023, in U.S. Appl. No. 17/681,311.

Notice of Allowance dated Nov. 8, 2023, in U.S. Appl. No. 17/681,311.

U.S. Appl. No. 17/681,311, filed Feb. 25, 2022, Hajime Yonemochi, Nikon Corporation.

U.S. Appl. No. 17/017,277, filed Sep. 10, 2020, Hajime Yonemochi, Nikon Corporation.

Japanese Office Action dated Oct. 7, 2025 for Japanese Application No. 2024-211933.

TW Office Action dated Dec. 24, 2025 for Taiwanese Application No. 112131317.

* cited by examiner

CONTROL DEVICE, CONTROL METHOD AND NON-TRANSITORY COMPUTER READABLE STORAGE MEDIUM

CROSS-REFERENCE TO RELATED APPLICATIONS

This application is a continuation of U.S. patent application Ser. No. 17/681,311 filed on Feb. 25, 2022, which is a continuation U.S. patent application Ser. No. 17/017,277 filed on Sep. 10, 2020, which is a continuation of International Patent Application No. PCT/JP2019/000383, filed on Jan. 9, 2019, which claims the foreign priority benefit to Japanese Patent Application No. 2018-047968, filed on Mar. 15, 2018, the contents of each of which are incorporated herein by reference.

BACKGROUND

1. Technical Field

The present invention relates to a control device, a control method and a non-transitory computer readable storage medium.

2. Related Art

In the related art, known is an imaging device having an AD conversion unit (for example, refer to Patent Document 1).

Patent Document 1: Japanese Translation of PCT International Patent Application No. 2008-259107

GENERAL DISCLOSURE

It is preferable to reduce an amount of data of the imaging device.

According to a first aspect of the present invention, there is provided a control device for controlling an imaging condition of a sensor having one or more pixels, the control device comprising an event detection unit for detecting an event indicating that a luminance signal changes in excess of a predetermined threshold value in one or more pixels, and for outputting an event detection signal; a counter for counting a number of events detected by the event detection unit; and a control unit for controlling the imaging condition of the sensor, based on the number of events.

According to a second aspect of the present invention, there is provided a control method for controlling an imaging condition of a sensor having one or more pixels, the control method comprising detecting an event indicating that a luminance signal changes in excess of a predetermined threshold value in one or more pixels; counting a number of events; and controlling the imaging condition of the sensor, based on the number of events.

According to a third aspect of the present invention, there is provided a non-transitory computer readable storage medium having stored thereon a program for controlling an imaging condition of a sensor having one or more pixels, the program causing a computer to perform operations comprising: detecting an event where a luminance signal changes in excess of a predetermined threshold value in the one or more pixels; counting a number of events; and controlling the imaging condition of the sensor, based on the number of events.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
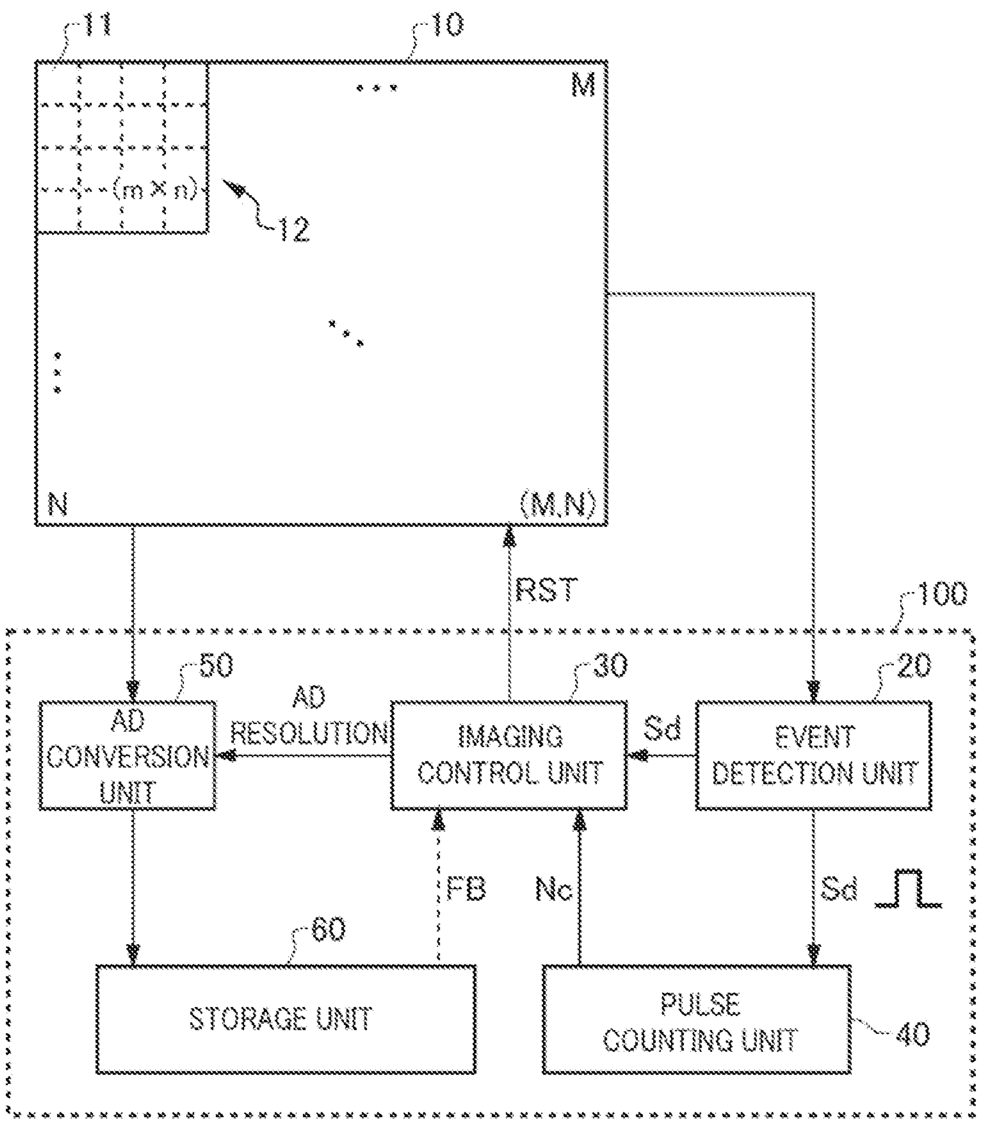
FIG. 1 shows an outline of a configuration of a sensor 300.

FIG. 1 shows an outline of a configuration of a sensor 300. The sensor 300 of the present example comprises a pixel unit 10 and a control device 100. The sensor 300 of the present example is a sensor that outputs a pixel signal from a portion at which luminance has changed by a predetermined level or higher, and is also referred to as an event drive type sensor.

The pixel unit 10 has one or more pixels 11. The pixel unit 10 of the present example has a plurality of pixels 11 arranged two-dimensionally. The pixel unit 10 of the present example has the M×N (M and N: natural numbers) pixels 11. The pixel 11 has at least one photoelectric conversion element. Thereby, the pixel unit 10 outputs pixel signals. In a case where one pixel 11 has two or more photoelectric conversion elements, at least one photoelectric conversion element outputs photocurrent as a pixel signal for event detection, and the remaining photoelectric conversion elements output accumulated charges as pixel signals. Also, in a case where one pixel 11 has one photoelectric conversion element, in a pixel block 12 which will be described later, a photoelectric conversion element corresponding to at least one pixel 11 outputs photocurrent as a pixel signal for event detection, and photoelectric conversion elements corresponding to the remaining pixels 11 output accumulated charges as pixel signals.

Also, the pixel unit 10 includes a pixel block 12 consisting of one or more pixels 11. The pixel block 12 is a region including the m×n (m and n: natural numbers) pixels 11.

The control device 100 controls an imaging condition of the sensor 300. In an example, the control device 100 is a control circuit that controls the imaging condition of the sensor 300, in response to the input pixel signals. The control device 100 comprises an event detection unit 20, an imaging control unit 30, a pulse counting unit 40, an AD conversion unit 50, and a storage unit 60.

The event detection unit 20 detects an event, based on the pixel signals output from the pixel unit 10. The pixel signals of the pixel unit 10 include a luminance signal S of the photocurrent detected by one or more pixels 11. In an example, the event detection unit 20 detects an event, based on comparison between the luminance signal S and a predetermined event detection threshold value.

Herein, the event detection unit 20 may use, as the event detection threshold value, an absolute value of the luminance signal S or an amount of change in the luminance signal S. For example, in a case where the absolute value of the luminance signal S is used, a plurality of event detection threshold values are provided for each predetermined luminance value, and the event detection unit 20 determines that an event has occurred when the luminance signal S exceeds the event detection threshold value. Also, in a case where the amount of change in the luminance signal S is used, the event detection unit 20 determines that an event has occurred when the amount of change in the luminance signal S exceeds the event detection threshold value. As such, the event indicates that there has been a change in the luminance signal S exceeding the event detection threshold value. The event detection unit 20 generates an event detection signal Sd for transmitting the event detection to the imaging control unit 30 and the pulse counting unit 40.

The event detection signal Sd is a signal including an event pulse for determining whether an event has occurred. The event detection unit 20 outputs the generated event detection signal Sd to the imaging control unit 30 and the pulse counting unit 40. In the meantime, the event detection unit 20 of the present example is provided to the control device 100 but may also be provided to the pixel unit 10.

The imaging control unit 30 controls the imaging condition of the sensor 300, based on the event detection signal Sd. In an example, the imaging control unit 30 controls the imaging condition, based on a number of event pulses of the event detection signal Sd. In the meantime, the imaging control unit 30 may also output a reset signal RST for resetting charges accumulated in the pixels 11 to the pixel unit 10, based on the event detection signal Sd. When the reset signal RST is input, the pixel unit 10 resets the accumulation of charges in the photoelectric conversion element and starts newly accumulation of charges (i.e., imaging).

The imaging condition includes at least one of an ADC resolution, an exposure time and a gain of an amplifier of the sensor 300. That is, the imaging control unit 30 controls at least one of an ADC resolution, an exposure time and a gain of an amplifier of the sensor 300, based on the event detection signal Sd. In an example, the imaging control unit 30 controls the ADC resolution of the AD conversion unit 50, based on the number of event pulses of the event detection signal Sd. In the meantime, a change in the ADC resolution may be executed for each single pixel 11. In this case, the control device 100 may drive each of the pixels 11 asynchronously.

The pulse counting unit 40 counts the event pulse, based on the event detection signal Sd, and generates a count value Nc. The pulse counting unit 40 outputs the generated count value Nc to the imaging control unit 30. The count value Nc may include an up-count and a down-count. The count value Nc may be a cumulative value of the up-count and the down-count or may be an integrated value of only the up-counts. The up-count is generated when the event detection signal Sd exceeds the event detection threshold value. On the other hand, the down-count is generated when the event detection signal Sd falls below the event detection threshold value.

The AD conversion unit 50 AD-converts the pixel signals output from the pixel unit 10. The AD conversion unit 50 of the present example operates with the ADC resolution output from the imaging control unit 30. The AD conversion unit 50 may execute AD conversion by using the ADC resolution that is different for each of one or more pixels 11 or for each block 12. The AD conversion unit 50 outputs the converted digital signal to the storage unit 60. In this way, in the present example, the luminance signal S by the photocurrent generated from the photoelectric conversion element included in the pixel 11 is input to the event detection unit 20 without via the AD conversion unit 50, and the pixel signal by the charges accumulated in the other photoelectric conversion elements is input to the AD conversion unit 50. Therefore, it is possible to quickly detect the event, and to implement low power consumption by executing AD conversion only for the pixel signal of the pixel 11 in which the change in luminance is large.

The storage unit 60 stores the digital signal from the AD conversion unit 50. In an example, the storage unit 60 outputs a memory value of a past frame to the imaging control unit 30, as a feedback signal FB. In this case, the imaging control unit 30 may control the imaging condition, based on the count value Nc from the pulse counting unit 40 and the feedback signal FB from the storage unit 60. Thereby, the control device 100 can control the imaging condition, based on the past output signal of the AD conversion unit 50.

Herein, the control method of the imaging condition by the imaging control unit 30 is described. The imaging control unit 30 counts the event pulse and controls the imaging condition, based on the count value Nc output from the pulse counting unit 40.

In an example, the imaging control unit 30 controls the imaging condition, based on a current count value Nc and a cumulative pulse value obtained by accumulating past count values Nc. In this case, the imaging control unit 30 holds the cumulative pulse value obtained by accumulating the past count values Nc. Then, the imaging control unit 30 reads out the held cumulative pulse value, and determines the imaging condition by using a cumulative number obtained by adding the current count value Nc to the read cumulative pulse value. In the meantime, the imaging control unit 30 may take into account of plus and minus of the count value Nc regarding the accumulation of the count value Nc. That is, the imaging control unit 30 cancels the positive count value Nc with the negative count value Nc. Since a luminance value per one count is predetermined, a luminance value corresponding to the current count value Nc is obtained using the accumulated count value.

In another example, the imaging control unit 30 controls the imaging condition, based on a current luminance value, and a past luminance value stored in the storage unit 60. In this case, the storage unit 60 holds the luminance value read from the AD conversion unit 50 in the past. In an example, the imaging control unit 30 controls the imaging condition, based on a luminance value output from the sensor 300, in response to previous event detection, and an event pulse output from the event detection unit 20, through new event detection. For example, the imaging control unit 30 calculates a current luminance value by adding or subtracting a current luminance value per one pulse to the luminance value stored in the storage unit 60. The imaging control unit 30 controls the imaging condition, based on the calculated current luminance value.

As described above, the control device 100 may control the imaging condition of the current event, based on both the luminance signal S of the past event and the pulse count value Nc under imaging. Thereby, even when an environment of the current event rapidly changes from a past event environment, it is possible to update the imaging condition with the change in environment. In the meantime, the control device 100 may also control the imaging condition of the current event, based on only the pulse count value Nc under imaging.

The control device 100 of the present example can execute AD conversion with a necessary and sufficient resolution for the luminance value by changing the ADC resolution, in accordance with the event detection. For this reason, it is possible to limit an output of unnecessary bits and to compress an amount of data. Also, the control device 100 can reduce power consumption by compressing the amount of data. The control device 100 can implement a high dynamic range by optimally adjusting the ADC resolution.

Figure 2:
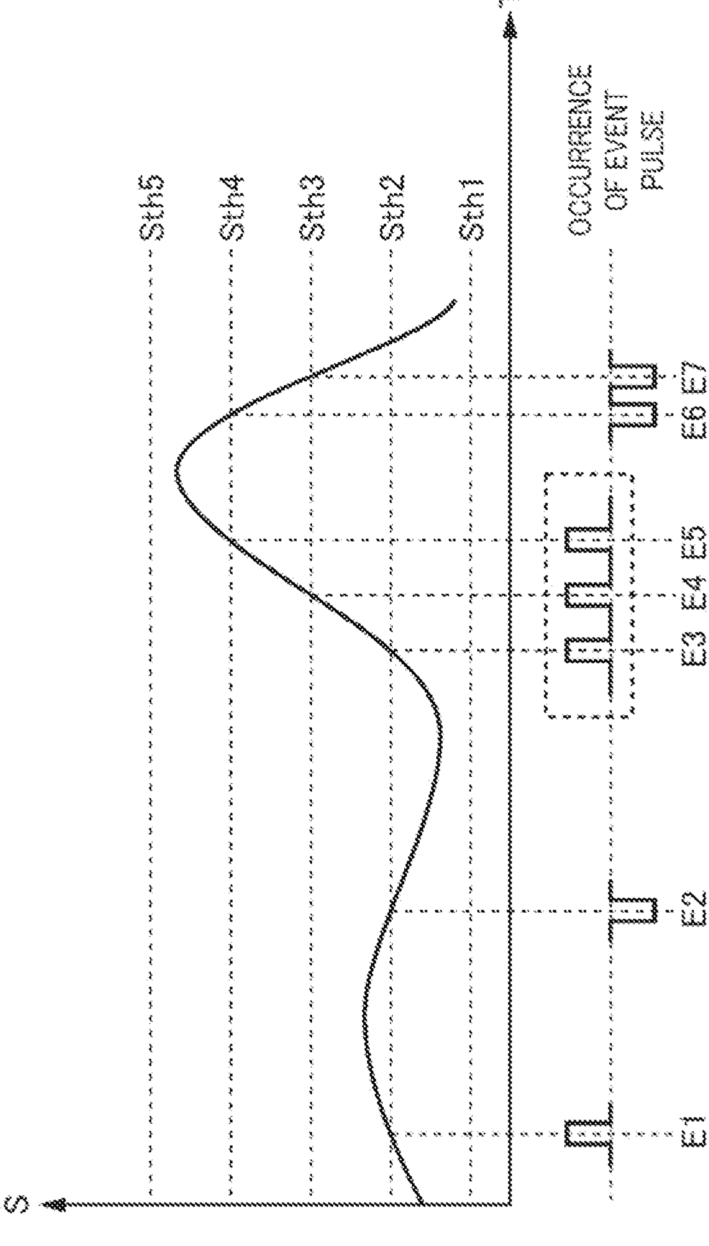
FIG. 2 shows an example of an event pulse counting method of a control device 100 in accordance with an embodiment.

FIG. 2 shows an example of an event pulse counting method of the control device 100 in accordance with an embodiment. The vertical axis indicates the luminance signal S, and the horizontal axis indicates time T. In the present example, the luminance signal S is used so as to detect an event. However, the other signals may also be used to detect the event.

The event detection unit 20 generates an event pulse, in accordance with a change in the luminance signal S. In an example, the event detection unit 20 sets one or more threshold values, and generates the event pulse when the luminance signal S exceeds the threshold values. The event detection unit 20 of the present example sets a threshold value Sth1 to a threshold value Sth5, and generates the event pulse when the luminance signal S becomes the threshold value Sth1 to the threshold value Sth5. That is, the event detection unit 20 generates the event pulse when the luminance signal S increases or decreases in excess of any one of the threshold value Sth1 to the threshold value Sth5. The threshold value Sth1 to the threshold value Sth5 are examples of the event detection threshold value.

For example, the event detection unit 20 generates an event pulse of an up-count when the luminance signal S exceeds any one of the threshold value Sth1 to the threshold value Sth5. On the other hand, the event detection unit 20 generates an event pulse of a down-count when the luminance signal S falls below any one of the threshold value Sth1 to the threshold value Sth5. In the present example, the threshold value Sth1 to the threshold value Sth5 are set at equal intervals but may also be set at unequal intervals.

The pulse counting unit 40 generates the count value Nc obtained by counting the event pulses generated from the event detection unit 20. The pulse counting unit 40 counts at least one of the up-count and the down-count. For example, the pulse counting unit 40 accumulates the count value, taking into account of plus and minus of the up-count and the down-count. Thereby, it is possible to detect whether the luminance signal S has increased or decreased by a predetermined value. In the present example, the imaging control unit 30 changes the imaging condition when the count value Nc of the pulse counting unit 40 reaches "+3". In the meantime, the reference level of the count value Nc may also be any value other than +3.

An event E1 to an event E7 indicate event pulses generated during a predetermined time period. In the meantime, the imaging control unit 30 may also output the reset signal RST to the pixel unit 10 and start the imaging each time an event occurs.

In the event E1, an event pulse of an up-count is generated. That is, it is indicated that an event pulse exceeds once any one of the threshold value Sth1 to the threshold value Sth5 in the event E1. In the present example, when the count value Nc of the pulse counting unit 40 becomes +1 as a result of one detection of the event pulse of the up-count, the imaging condition is not changed.

In the event E2, an event pulse of a down-count is generated. That is, it is indicated that an event pulse falls once below any one of the threshold value Sth1 to the threshold value Sth5 in the event E2. In the present example, when the count value Nc of the pulse counting unit 40 becomes −1 as a result of one detection of the event pulse of the down-count, the imaging condition is not changed.

In the events E3 to E5, three event pulses of an up-count are generated. That is, the event E3 to E5 exceeds three times any one of the threshold value Sth1 to the threshold value Sth5, so that the count value Nc of the pulse counting unit 40 becomes +3. Since the count value Nc of the pulse counting unit 40 reaches +3, the imaging control unit 30 determines that brightness of an imaging target has largely changed by a predetermined level or higher, and changes the imaging condition. For example, when the count value Nc of the pulse counting unit 40 becomes +3 or greater, the imaging control unit 30 lowers the ADC resolution.

More specifically, when the count value Nc of the pulse counting unit 40 exceeds +n (n: predetermined integer), the AD conversion may be executed without using a predetermined lower-order bit. When an imaging target is bright, an output of a lower-order bit is hidden by noises. Therefore, even when a resolution of a luminance range that is detected by the sensor 300 is lowered, a pixel signal to be obtained is little affected. The predetermined lower-order bit is a 2-digit bit from the least significant bit, for example.

On the other hand, when the count value Nc of the pulse counting unit 40 falls below −n, the AD conversion may be executed without using a predetermined upper-order bit. When an imaging target is dark, the upper-order bit becomes zero and is not primarily required. For this reason, even when the upper-order bit is not used, a pixel signal to be obtained is not affected. The predetermined upper-order bit is a 2-digit bit from the most significant bit, for example.

The control device 100 of the present example controls the imaging condition by detecting an event corresponding to change in the luminance signal S. Thereby, the control device 100 can update the imaging condition, in response to high-speed change in the luminance signal S.

Figure 3:
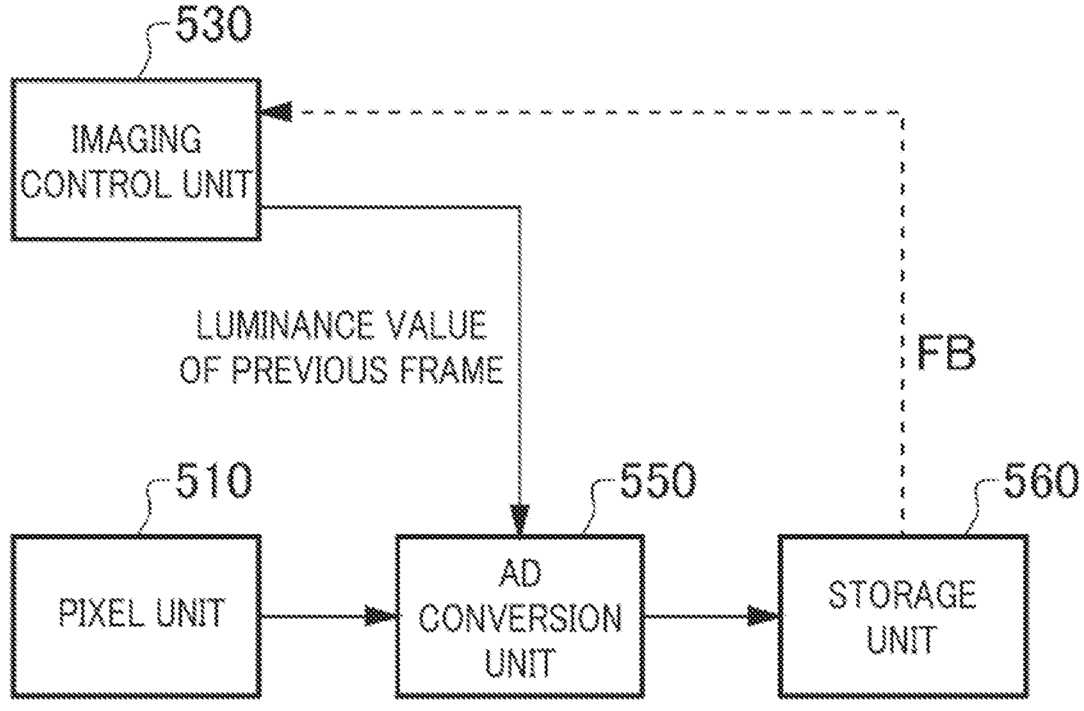
FIG. 3 shows a configuration of a sensor 500 in accordance with Comparative Example.

FIG. 3 shows a configuration of a sensor 500 in accordance with Comparative Example. The sensor 500 of the present example includes a pixel unit 510, an imaging control unit 530, an AD conversion unit 550, and a storage unit 560.

The sensor 500 determines an ADC resolution of the AD conversion unit 550, based on pixel signals output from the pixel unit 510. The sensor 500 may store the determined ADC resolution in the storage unit 560.

The storage unit 560 outputs imaging information of a past frame to the imaging control unit 530, as a feedback signal FB. The imaging control unit 530 outputs a past imaging condition to the AD conversion unit 550. The AD conversion unit 550 controls the ADC resolution, based on the past imaging condition and the pixel signals from the pixel unit 510.

Figure 4:
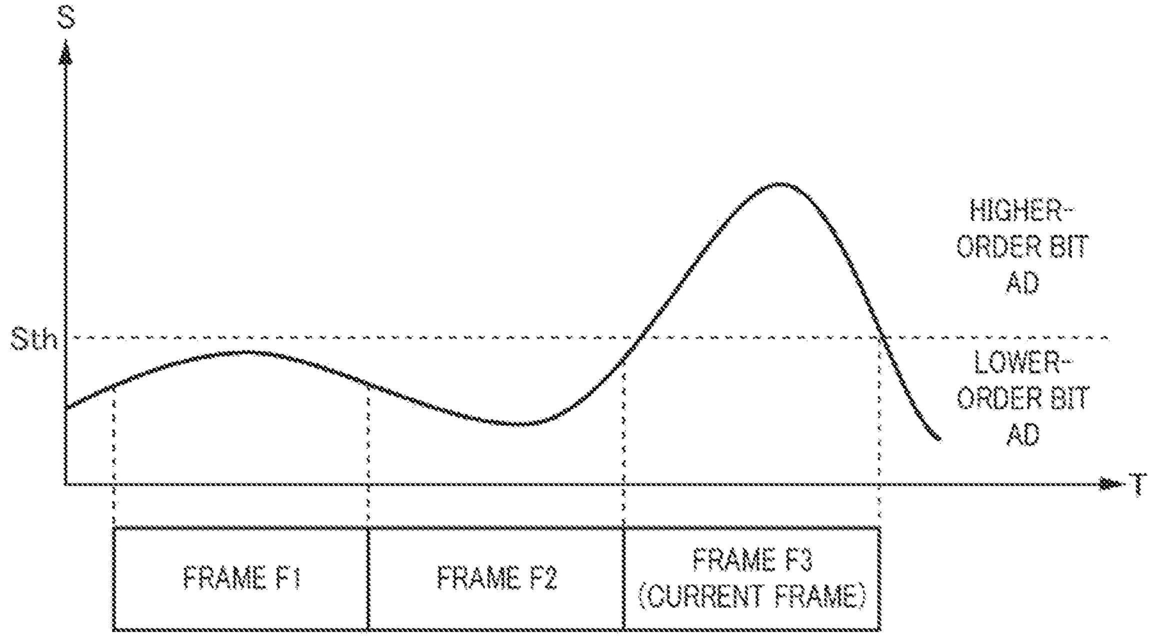
FIG. 4 shows an example of an ADC resolution determining method of the sensor 500 in accordance with Comparative Example.

FIG. 4 shows an example of an ADC resolution determining method of the sensor 500 in accordance with Comparative Example. The sensor 500 of the present example sets the ADC resolution, based on comparison between the luminance signal S and the luminance threshold value Sth.

The sensor 500 sets the ADC resolution in a frame unit of a predetermined length. That is, the sensor 500 compares the luminance signal S and the luminance threshold value Sth for each frame. For example, when the luminance signal S is smaller than the luminance threshold value Sth, the sensor 500 AD-converts only the lower-order bits, and when the luminance signal S is greater than the luminance threshold value Sth, the sensor 500 AD-converts only the upper-order bits. In other words, when the luminance signal S is smaller than the luminance threshold value Sth, the AD conversion for the upper bits is not required, and when the luminance signal S is greater than the luminance threshold value Sth, the AD conversion for the lower bits is not required.

The sensor 500 calculates the ADC resolution of a current frame, based on a luminance signal of a past frame. For example, the sensor 500 sets an ADC resolution of a frame F3 that is a current frame, based on at least one data of a frame F1 and a frame F2 that are past frames. For this reason, when the luminance signal S rapidly changes and the ADC resolution switches between the past frame and the current frame, it is difficult to set an appropriate ADC resolution. Since the AD conversion for lower-order bits is set in the past frame, even when it is needed to select the AD conversion for upper-order bits in the current frame, the sensor 500 of the present example executes the AD conversion only for lower-order bits because it is not possible to estimate brightness of the current frame from data of the past frame.

In this way, the sensor 500 adjusts the ADC resolution of the current frame, based on the past frame. Therefore, when an environment of the current frame rapidly changes from an environment of the past frame, it is difficult to optimally update the imaging condition, following the change in environment. That is, the control on the imaging condition based on the event is affected by the imaging frame.

In the meantime, the control device 100 acquires the change in the luminance signal S, as the count number of the event pulses, and controls the imaging condition. For this reason, the control device 100 can quickly control the imaging condition, following the change in the luminance signal S, not from the past imaging frame.

Figure 5:
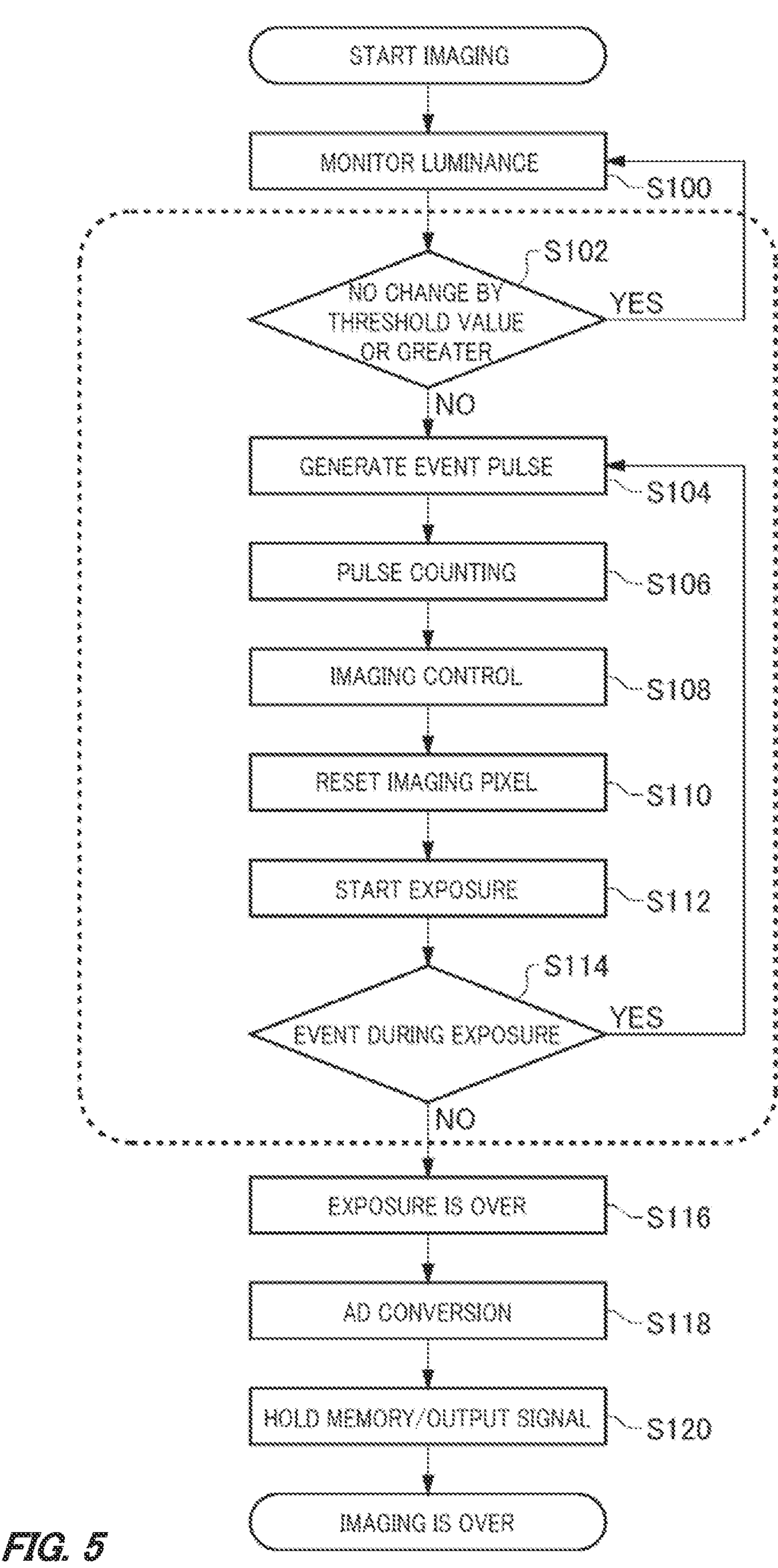
FIG. 5 shows an example of a flowchart of operations of the control device 100.

FIG. 5 shows an example of a flowchart of operations of the control device 100. The control device 100 may control the imaging condition of the sensor 300 by using the flowchart of the present example. In the flowchart of the present example, the pixel 11 is reset each time the event pulse is generated.

The control device 100 monitors the luminance signal S output from the pixel 11 (S100). The control device 100 determines whether the luminance signal S has changed by a predetermined event detection threshold value or greater (S102). Specifically, the event detection unit 20 detects an event where the luminance signal S changes in excess of the event detection threshold value in one or more pixels 11. When the luminance signal S does not change by the event detection threshold value or greater, the control device 100 continues to monitor the luminance signal S (S100). On the other hand, when the luminance signal S changes by the event detection threshold value or greater, the control device 100 generates and outputs an event pulse to the pulse counting unit 40 (S104).

Then, the imaging control unit 30 counts the event pulse from the event detection unit 20 (S106). The imaging control unit 30 controls the imaging condition of the sensor 300, based on the detection of the event (S108). For example, when the count value Nc calculated by the pulse counting unit 40 reaches a preset reference level, the imaging control unit 30 controls the imaging condition, based on the count value Nc. The imaging condition that is controlled by the imaging control unit 30 may be any one of an ADC resolution, an exposure time and a gain of an amplifier of the sensor 300. The control device 100 resets the charges accumulated in the pixel 11 (S110). The control device 100 causes the sensor 300 to start exposure after controlling the imaging condition (S112). That is, the control device 100 of the present example starts exposure after the imaging control unit 30 updates the imaging condition. In step S108, when at least one of the exposure time and the gain of the amplifier is updated, the updated imaging condition is used.

When the event detection unit 20 detects an event during an exposure period, the imaging control unit 30 of the present example re-controls the imaging condition, resets one or more pixels 11 and causes the sensor 300 to restart exposure. For example, when an event occurs during the exposure period (S114), the event detection unit 20 starts generation of an event pulse (S104). On the other hand, when an event does not occur during the exposure period (S114), the control device 100 ends the exposure (S116).

After the exposure is over, the AD conversion unit 50 AD-converts the pixel signal output from the pixel unit 10 (S118). Then, in step S108, when the imaging control unit 30 updates the ADC resolution as the imaging condition, the pixel signal is AD-converted based on the updated imaging condition. Then, the storage unit 60 may store the converted digital signal and output the stored digital signal to an outside (S120).

Figure 6:
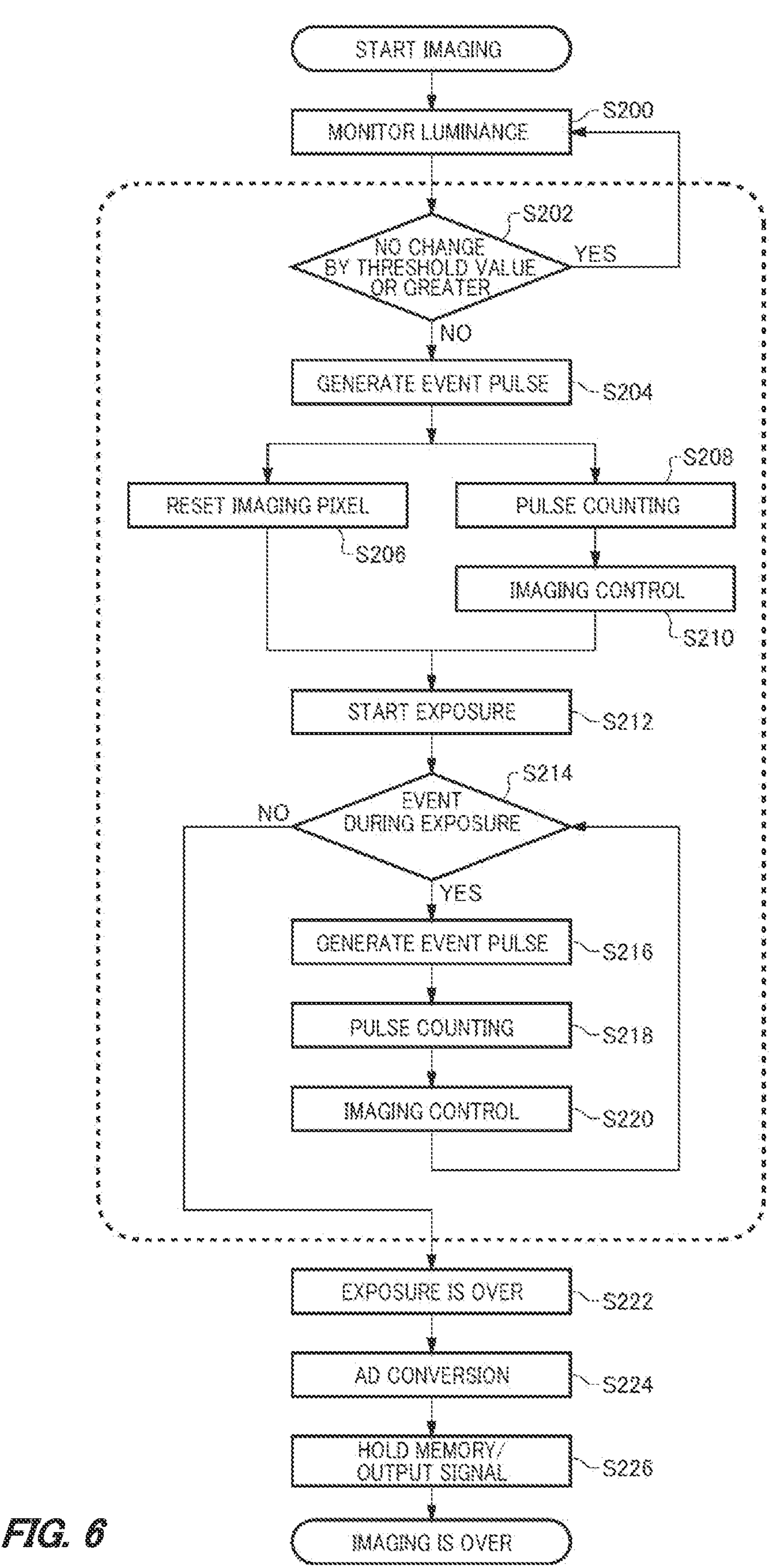
FIG. 6 shows an example of a flowchart of operations of the control device 100.

FIG. 6 shows an example of a flowchart of operations of the control device 100. The control device 100 may control the imaging condition of the sensor 300 by using the flowchart of the present example. The flowchart of the present example is different from the flowchart of FIG. 5, in that the pixel 11 is not reset after the imaging condition is calculated until the exposure is caused to start. That is, after resetting once the pixel 11 to update the imaging condition, the control device 100 of the present example starts the exposure without resetting the pixel 11.

Step S200 and step S202 corresponds to step S100 and step S102 of FIG. 5, respectively. In step S202, when the luminance signal S changes by the predetermined event detection threshold value or greater, the event detection unit 20 starts generation of the event pulse (S204). Then, the imaging control unit 30 resets the pixel 11 (S206). Also, the pulse counting unit 40 counts the generated event pulse (S208). Then, when the count value Nc from the pulse counting unit 40 reaches the preset reference level, the imaging control unit 30 sets the imaging condition and controls the imaging of the control device 100, based on the count value Nc (S210).

The control device 100 starts the exposure, based on the updated imaging condition (S212). That is, the control device 100 of the present example starts the exposure, after the imaging control unit 30 controls the imaging condition, based on the count value Nc of the event pulse, and resets the pixel unit 10.

Then, when an event occurs during the exposure period (S214), the event detection unit 20 starts generation of an event pulse (S216). Also, the pulse counting unit 40 counts the generated event pulse (S218). Then, while continuing the exposure by the sensor 300, when the count value Nc from the pulse counting unit 40 reaches the preset reference level, the imaging control unit 30 controls the imaging condition, based on the count value Nc (S220).

In this way, when the event detection unit 20 detects an event during the exposure period by the sensor 300, the imaging control unit 30 of the present example re-controls the imaging condition and causes the sensor 300 to continuously perform the exposure. That is, the control device 100 may update the imaging condition before the exposure starts or may update the imaging condition during the exposure. On the other hand, after the exposure is started (S212), when an event does not occur during the exposure period (S214), the exposure by the sensor 300 is ended (S222).

After the exposure is over, the AD conversion unit 50 AD-converts the pixel signal output from the pixel unit 10 (S224). Then, when the imaging control unit 30 updates the ADC resolution as the imaging condition in step S210 and step S220, the AD conversion unit AD-converts the pixel signal, based on the latest ADC resolution. Then, the storage unit 60 may store the converted digital signal and output the stored digital signal to an outside (S226).

In this way, after resetting once the pixel 11 to update the imaging condition, the control device 100 can start the exposure without resetting the pixel 11. Also, the update of the imaging condition by the control device 100 may be performed before the exposure starts or during the exposure period. Thereby, the control device 100 can implement the imaging with the optimal imaging condition corresponding to the occurrence of event.

Figure 7:
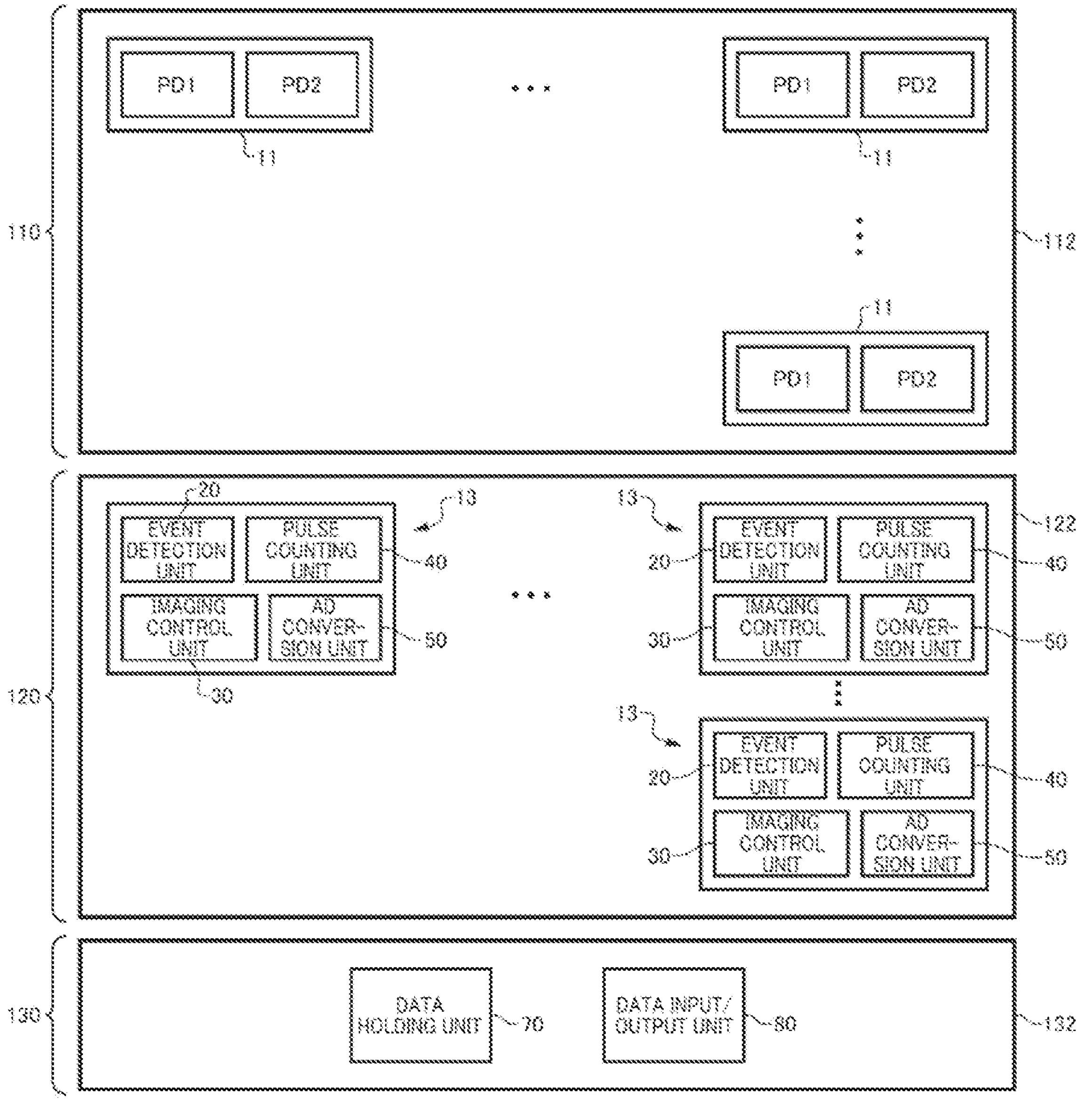
FIG. 7 shows an example of a more specific configuration of the sensor 300.

FIG. 7 shows an example of a more specific configuration of the sensor 300. The sensor 300 of the present example includes a first substrate 110, a second substrate 120, and a third substrate 130.

The first substrate 110 has a pixel block array 112. The pixel block array 112 has one or more pixels 11. In the present example, the pixel block array 112 has the M×N pixels 11. The pixel 11 has a first photoelectric conversion element PD1 and a second photoelectric conversion element PD2. For example, the first photoelectric conversion element PD1 is an event detection element that detects an event. Also, the second photoelectric conversion element PD2 is a light receiving element that captures an image.

The second substrate 120 has a processing block array 122. The processing block array 122 has M×N data processing units 13. The second substrate 120 is stacked on the first substrate 110.

The data processing unit 13 includes the event detection unit 20, the imaging control unit 30, the pulse counting unit 40, and the AD conversion unit 50. The M×N data processing units 13 are provided corresponding to the M×N pixels 11. The description "provided corresponding to" indicates that the M×N data processing units 13 are each electrically connected to each of the M×N pixels 11. Also, the description "provided corresponding to" may indicate that the M×N data processing units 13 are each provided facing each of the M×N pixels 11.

The data processing unit 13 of the present example executes data processing for the pixel 11 provided corresponding to the data processing unit. When the data processing unit 13 is provided immediately below the pixel 11, length of wiring is shortened to improve a processing speed. For example, at least one of the event detection unit 20 and the imaging control unit 30 is provided to the second substrate 120, in correspondence to the block consisting of one or more pixels 11. Thereby, it is possible to enlarge a pixel opening of the pixel 11 provided to the first substrate 110.

The third substrate 130 has an output block array 132. The output block array 132 includes a data holding unit 70 and a data input/output unit 80. The third substrate 130 is stacked on the second substrate 120. That is, the first substrate 110, the second substrate 120 and the third substrate 130 are provided stacked.

The data holding unit 70 holds captured data of the sensor 300. For example, the data holding unit 70 temporarily holds captured data acquired at the processing block array 122. The captured data may include data such as imaging condition, in addition to image data acquired by the pixel unit 10. The data input/output unit 80 outputs the captured data held by the data holding unit 70 to an outside. Also, the data input/output unit 80 may output the captured data to the imaging control unit 30.

Like this, in the sensor 300 of the present example, the M×N imaging control units 30 are provided corresponding to the M×N pixels 11. For this reason, the sensor 300 can control the imaging condition for each of the M×N pixels 11. Thereby, the sensor 300 can set the appropriate imaging condition for each pixel 11, in accordance with a luminance distribution in a screen. For example, the ADC resolution is set for each of the M×N pixels 11, so that it is possible to reduce unnecessary bits and to suppress a data output band, as compared to a case where all pixels are AD-converted with an ADC resolution that is uniform for all pixels. The sensor 300 of the present example can reduce an amount of data while maintaining an image quality by feeding back a necessary and sufficient bit depth for each of the M×N pixels 11 to the AD conversion unit 50.

Figure 8:
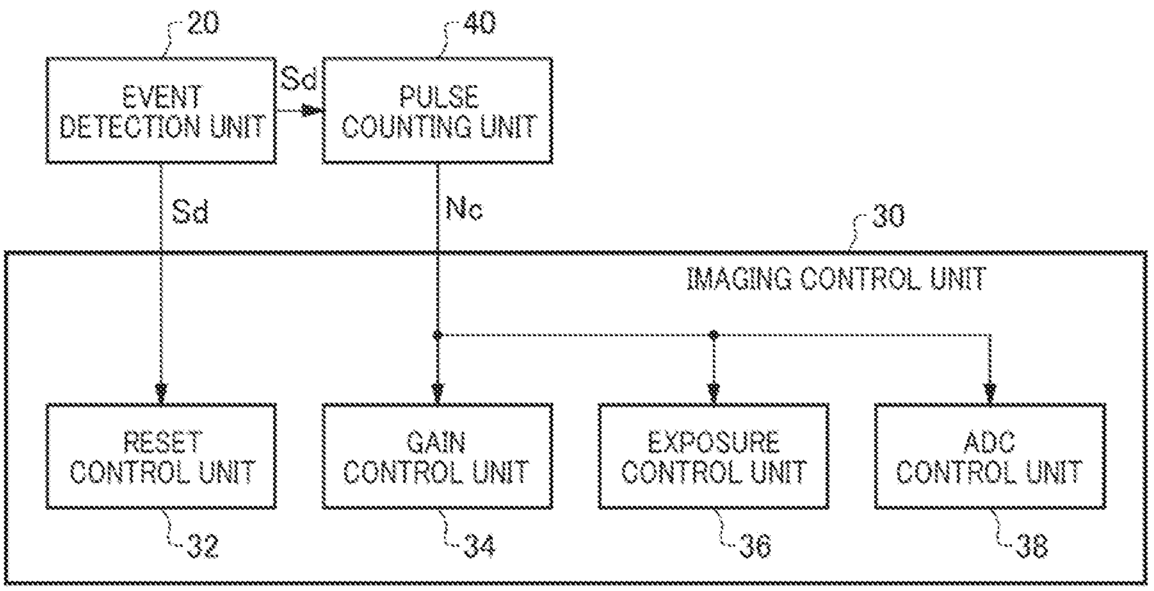
FIG. 8 shows an example of a more specific configuration of an imaging control unit 30.

FIG. 8 shows an example of a more specific configuration of the imaging control unit 30. The imaging control unit 30 includes a reset control unit 32, a gain control unit 34, an exposure control unit 36, and an ADC control unit 38.

The reset control unit 32 generates a reset signal RST for resetting charges accumulated in the pixel 11. The reset control unit 32 outputs the generated reset signal RST to the pixel unit 10, based on the event detection signal Sd input from the event detection unit 20. For example, in a case of an operation based on the flowchart of FIG. 6, when the event detection signal Sd indicating that an event has occurred is input, the reset control unit 32 outputs the reset signal RST to the pixel unit 10.

The gain control unit 34 controls a gain of an amplifier provided to the sensor 300, based on the count value Nc input from the pulse counting unit 40. For example, the gain control unit 34 sets a gain smaller than a previous value when the count value Nc exceeds the predetermined threshold value, and sets a gain larger than a previous value when the count value Nc falls below the predetermined threshold value.

The exposure control unit 36 controls an exposure condition such as an exposure time, based on the count value Nc input from the pulse counting unit 40. For example, the exposure control unit 36 sets an exposure time shorter than a previous time when the count value Nc exceeds the predetermined threshold value, and sets an exposure time longer than a previous time when the count value Nc falls below the predetermined threshold value. Also, the exposure control unit 36 may set an exposure time longer than a previous time when a luminance of an image falls below a predetermined threshold value and may set an exposure time shorter than a previous time when a luminance of an image exceeds the predetermined threshold value.

The ADC control unit 38 controls the ADC resolution, based on the count value Nc input from the pulse counting unit 40. For example, the ADC control unit 38 sets an ADC resolution lower than a previous resolution when the count value Nc exceeds the predetermined threshold value, and sets an ADC resolution higher than a previous resolution when the count value Nc falls below the predetermined threshold value. Also, the ADC control unit 38 may increase the ADC resolution when a luminance of an image falls below a predetermined threshold value, and may lower the ADC resolution when a luminance of an image exceeds the predetermined threshold value. In the meantime, a plurality of the control on the gain by the gain control unit 34, the control on the exposure time by the exposure control unit 36, and the control on the ADC resolution by the ADC control unit 38 may be performed in combination. At this time, the same count value Nc or the different count values Nc may be set as the threshold values that are referred to by the control units.

Figure 9:
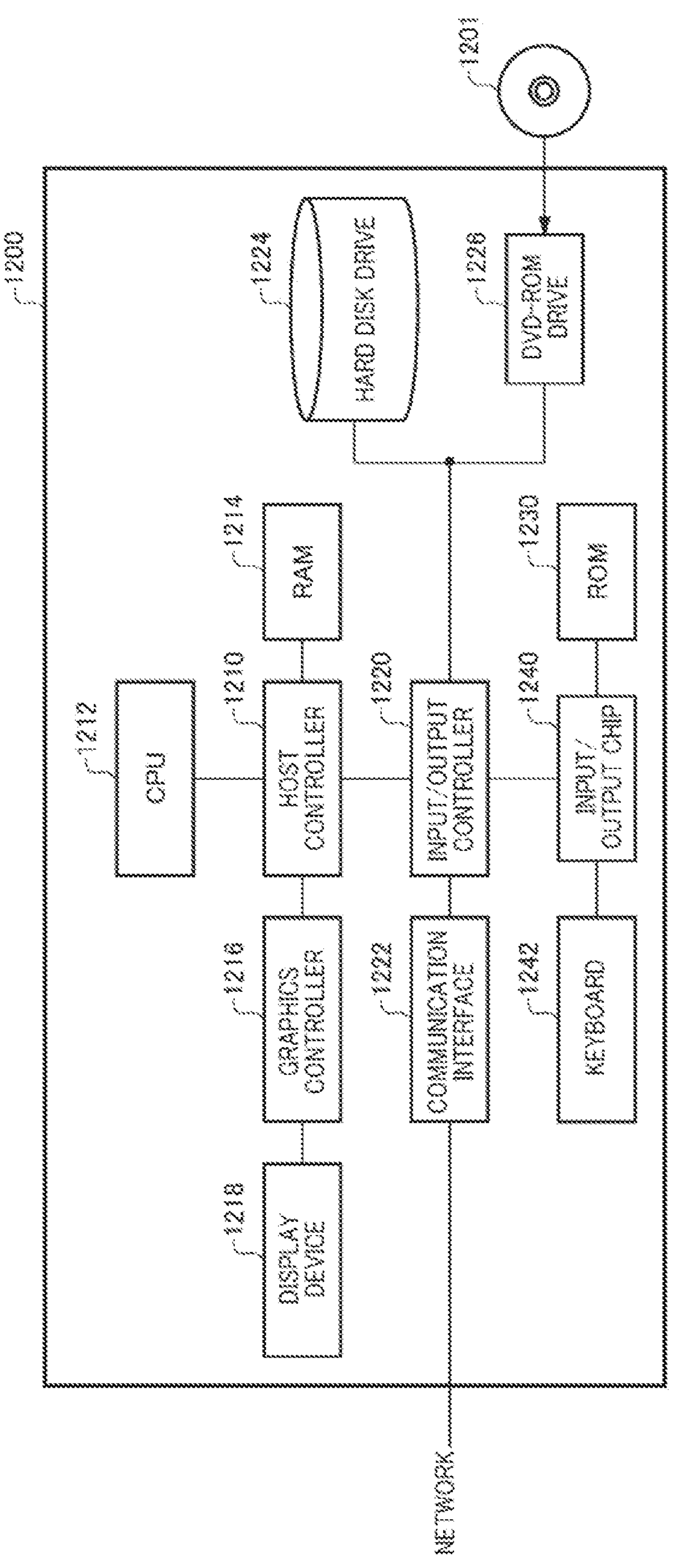
FIG. 9 shows an example of a computer 1200 in which a plurality of aspects of the present invention may be implemented entirely or partially.

FIG. 9 shows an example of a computer 1200 in which a plurality of aspects of the present invention may be implemented entirely or partially. A program that is installed in the computer 1200 can cause the computer 1200 to function as one or more "sections" in an operation or an apparatus associated with the embodiment of the present invention, or cause the computer 1200 to perform the operation or the one or more sections thereof, and/or cause the computer 1200 to perform processes of the embodiment of the present invention or steps thereof. Such a program may be performed by a CPU 1212 so as to cause the computer 1200 to perform certain operations associated with some or all of the blocks of flowcharts and block diagrams described herein.

The computer 1200 in accordance with the present embodiment includes a CPU 1212, a RAM 1214, a graphic controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 via an input/output chip 1240.

The CPU 1212 operates according to programs stored in the ROM 1230 and the RAM 1214, thereby controlling each unit. The graphic controller 1216 obtains image data generated by the CPU 1212 on a frame buffer or the like provided in the RAM 1214 or in itself, and causes the image data to be displayed on a display device 1218.

The communication interface 1222 performs communication with other electronic devices via a network. The hard disk drive 1224 stores programs and data that are used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like that is performed by the computer 1200 at the time of activation, and/or a program depending on the hardware of the computer 1200. The input/output chip 1240 may also connect various input/output units to the input/output controller 1220 via a parallel port, a serial port, a keyboard port, a mouse port or the like.

A program is provided by computer readable media such as the DVD-ROM 1201 or the IC card. The program is read from the computer readable media, installed into the hard disk drive 1224, RAM 1214, or ROM 1230, which are also examples of computer readable media, and performed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may perform a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the hard disk drive 1224, the DVD-ROM 1201, or the IC card, and transmits the read transmission data to a network or writes reception data received from a network into a reception buffer region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as “first” or “next” in the claims, embodiments, or diagrams, it does not necessarily mean that the process must be performed in this order.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

EXPLANATION OF REFERENCES

10 . . . pixel unit, 11 . . . pixel, 12 . . . block, 13 . . . data processing unit, 20 . . . event detection unit, 30 . . . imaging control unit, 32 . . . reset control unit, 34 . . . gain control unit, 36 . . . exposure control unit, 38 . . . ADC control unit, 40 . . . pulse counting unit, 50 . . . AD conversion unit, 60 . . . storage unit, 70 . . . data holding unit, 80 . . . data input/output unit, 100 . . . control device, 110 . . . first substrate, 112 . . . pixel block array, 120 . . . second substrate, 122 . . . processing block array, 130 . . . third substrate, 132 . . . output block array, 300 . . . sensor, 500 . . . sensor, 510 . . . pixel unit, 530 . . . imaging control unit, 550 . . . AD conversion unit, 560 . . . storage unit, 1200 . . . computer, 1201 . . . DVD-ROM, 1210 . . . host controller, 1212 . . . CPU, 1214 . . . RAM, 1216 . . . graphic controller, 1218 . . . display device, 1220 . . . input/output controller, 1222 . . . communication interface, 1224 . . . hard disk drive, 1226 . . . DVD-ROM drive, 1230 . . . ROM, 1240 . . . input/output chip, 1242 . . . keyboard

What is claimed is:

1. A sensor comprising:

a first substrate that has a first pixel block, including a first photoelectric conversion element for converting light into charges and a second photoelectric conversion element for converting light into charges, and a second pixel block, including a third photoelectric conversion element for converting light into charges and a fourth photoelectric conversion element for converting light into charges; and a second substrate that is a substrate stacked with the first substrate and that has a first processing block, including a first event detection unit for detecting an event using a signal that is based on the charges converted at the first photoelectric conversion element and a first control unit for performing an exposure control of the second photoelectric conversion element based on a detection result of the first event detection unit, and a second processing block, including a second event detection unit for detecting an event using a signal that is based on the charges converted at the third photoelectric conversion element and a second control unit for performing an exposure control of the fourth photoelectric conversion element based on a detection result of the second event detection unit.

2. The sensor according to claim 1, wherein the first control unit controls an exposure time of the second photoelectric conversion element based on the detection result of the first event detection unit, and the second control unit controls an exposure time of the fourth photoelectric conversion element based on the detection result of the second event detection unit.

3. The sensor according to claim 1, wherein the first processing block includes a first counting unit for counting the event detected at the first event detection unit, the second processing block includes a second counting unit for counting the event detected at the second event detection unit, the first control unit performs the exposure control of the second photoelectric conversion element based on a counting result of the first counting unit, and the second control unit performs the exposure control of the fourth photoelectric conversion element based on a counting result of the second counting unit.

4. The sensor according to claim 1, wherein the first processing block includes a first signal processing unit for performing a signal processing on a signal that is based on the charges converted at the second photoelectric conversion element, and the second processing block includes a second signal processing unit for performing a signal processing on a signal that is based on the charges converted at the fourth photoelectric conversion element.

5. The sensor according to claim 4, wherein the first signal processing unit includes a first conversion unit for converting the signal that is based on the charges converted at the second photoelectric conversion element into a digital signal, and the second signal processing unit includes a second conversion unit for converting the signal that is based on the charges converted at the fourth photoelectric conversion element into a digital signal.

6. The sensor according to claim 5, further comprising:

a third substrate that is a substrate stacked with the first substrate and that has a holding unit for holding a first digital signal, which is converted into the digital signal at the first conversion unit from the signal that is based on the charges converted at the second photoelectric conversion element, and a second digital signal, which is converted into the digital signal at the second conversion unit from the signal that is based on the charges converted at the fourth photoelectric conversion element.

7. The sensor according to claim 6, wherein the third substrate has an output unit for outputting the first digital signal held at the holding unit and the second digital signal held at the holding unit.

8. The sensor according to claim 4, wherein the first control unit controls the first signal processing unit based on the detection result of the first event detection unit, and the second control unit controls the second signal processing unit based on the detection result of the second event detection unit.

9. The sensor according to claim 1, wherein the first processing block is arranged at a position facing the first pixel block in a stacking direction in which the first substrate and the second substrate are stacked, and the second processing block is arranged at a position facing the second pixel block in the stacking direction.

10. The sensor according to claim 1, wherein the second pixel block is arranged alongside the first pixel block in a direction of row.

11. The sensor according to claim 1, wherein the second pixel block is arranged alongside the first pixel block in a direction of column.

12. The sensor according to claim 1, wherein the first substrate has a third pixel block, including a fifth photoelectric conversion element for converting light into charges and a sixth photoelectric conversion element for converting light into charges, and the second substrate has a third processing block, including a third event detection unit for detecting an event using a signal that is based on the charges converted at the fifth photoelectric conversion element and a third control unit for performing an exposure control of the sixth photoelectric conversion element based on a detection result of the third event detection unit.

13. The sensor according to claim 12, wherein the first control unit controls an exposure time of the second photoelectric conversion element based on the detection result of the first event detection unit, the second control unit controls an exposure time of the fourth photoelectric conversion element based on the detection result of the second event detection unit, and the third control unit controls an exposure time of the sixth photoelectric conversion element based on the detection result of the third event detection unit.

14. The sensor according to claim 12, wherein the first processing block includes a first counting unit for counting the event detected at the first event detection unit, the second processing block includes a second counting unit for counting the event detected at the second event detection unit, the third processing block includes a third counting unit for counting the event detected at the third event detection unit, the first control unit performs the exposure control of the second photoelectric conversion element based on a counting result of the first counting unit, the second control unit performs the exposure control of the fourth photoelectric conversion element based on a counting result of the second counting unit, and the third control unit performs the exposure control of the sixth photoelectric conversion element based on a counting result of the third counting unit.

15. The sensor according to claim 12, wherein the first processing block includes a first signal processing unit for performing a signal processing on a signal that is based on the charges converted at the second photoelectric conversion element, the second processing block includes a second signal processing unit for performing a signal processing on a signal that is based on the charges converted at the fourth photoelectric conversion element, and the third processing block includes a third signal processing unit for performing a signal processing on a signal that is based on the charges converted at the sixth photoelectric conversion element.

16. The sensor according to claim 15, wherein the first signal processing unit includes a first conversion unit for converting the signal that is based on the charges converted at the second photoelectric conversion element into a digital signal, the second signal processing unit includes a second conversion unit for converting the signal that is based on the charges converted at the fourth photoelectric conversion element into a digital signal, and the third signal processing unit includes a third conversion unit for converting the signal that is based on the charges converted at the sixth photoelectric conversion element into a digital signal.

17. The sensor according to claim 16, further comprising: a third substrate that is a substrate stacked with the first substrate and that has a holding unit for holding a first digital signal, which is converted into the digital signal at the first conversion unit from the signal that is based on the charges converted at the second photoelectric conversion element, a second digital signal, which is converted into the digital signal at the second conversion unit from the signal that is based on the charges converted at the fourth photoelectric conversion element, and a third digital signal, which is converted into the digital signal at the third conversion unit from the signal that is based on the charges converted at the sixth photoelectric conversion element.

18. The sensor according to claim 17, wherein the third substrate has an output unit for outputting the first digital signal held at the holding unit, the second digital signal held at the holding unit, and the third digital signal held at the holding unit.

19. The sensor according to claim 15, wherein the first control unit controls the first signal processing unit based on the detection result of the first event detection unit, the second control unit controls the second signal processing unit based on the detection result of the second event detection unit, and the third control unit controls the third signal processing unit based on the detection result of the third event detection unit.

20. The sensor according to claim 12, wherein the first processing block is arranged at a position facing the first pixel block in a stacking direction in which the first substrate and the second substrate are stacked, the second processing block is arranged at a position facing the second pixel block in the stacking direction, and the third processing block is arranged at a position facing the third pixel block in the stacking direction.

21. The sensor according to claim 12, wherein the second pixel block is arranged alongside the first pixel block in a direction of row.

22. The sensor according to claim 21, wherein the third pixel block is arranged alongside the first pixel block in the direction of row.

23. The sensor according to claim 21, wherein the third pixel block is arranged alongside the first pixel block in a direction of column.

24. The sensor according to claim 12, wherein the second pixel block is arranged alongside the first pixel block in a direction of column.

25. The sensor according to claim 24, wherein the third pixel block is arranged alongside the first pixel block in the direction of column.

* * * * *